United States Patent [19]

Bemis et al.

[11] Patent Number: 5,017,142
[45] Date of Patent: May 21, 1991

[54] INTERACTIVE METHOD FOR TESTING WORKING MEMORY

[75] Inventors: Suzanne V. Bemis, San Diego; Ernst A. Winer, Oceanside, both of Calif.; Jeffrey L. Leeds, Tempe, Ariz.; Kevin D. Athey, Anaheim, Calif.

[73] Assignee: The United States of America as represented by the Secretary of the Navy, Washington, D.C.

[21] Appl. No.: 433,070

[22] Filed: Nov. 7, 1989

[51] Int. Cl.$^5$ .............................................. G09B 19/14
[52] U.S. Cl. .................................... 434/220; 434/219; 434/238; 273/1 GE; 364/439
[58] Field of Search ............... 434/169, 201, 219, 220, 434/305, 307, 236, 237, 238, 315, 322, 323, 362, 372, 428, 429; 273/1 E, 1 GC, DIG. 28; 364/551.01, 439

[56] References Cited

U.S. PATENT DOCUMENTS 4,337,948  7/1982  Breslow et al. ................. 273/1 GC
4,580,779  4/1986  Kanamaru et al. .................. 273/1 E
4,770,636  9/1988  Buschke ............................. 434/236

FOREIGN PATENT DOCUMENTS 1275516  12/1986  U.S.S.R. .............................. 434/219

OTHER PUBLICATIONS

"At air traffic control school, it helps to memorize in your sleep" by James R. Chiles, Smithsonian, pp. 123-131, Jan. 1990.

Primary Examiner—Richard J. Apley
Assistant Examiner—Joe H. Cheng
Attorney, Agent, or Firm—Harvey Fendelman; Thomas Glenn Deough; Michael A. Kagan

[57] ABSTRACT

The present invention provides an interactive method for testing the working memory of a test subject. The method includes displaying several encoded symbols randomly positioned on a video display for a predetermined period of time. The position of each encoded symbol corresponds to Cartesian coordinates on the video display. Each symbol has a predetermined priority that must be ascertained by the test subject based on recognized variables associated with each uncoded symbol. The symbols are deleted from the video display after expiration of the predetermined period. Then, unencoded symbols are displayed on the video display in the same pattern as were the encoded symbols so that there is a cardinal relationship between the Cartesian coordinates of the unencoded symbols and those of the encoded symbols. Each encoded and unencoded symbol having identical coordinates forms a symbol pair. The test subject's task is to assign a priority to the unencoded symbols based on the test subject's recollection of the priority of each encoded symbol. The software implementing the present invention compares the assigned priorities of the unencoded symbols to the actual priority of the encoded symbols and provides an output which is the sum of the number of correct priority assignments.

6 Claims, 4 Drawing Sheets

ALTITUDE

| LESS THAN 10,000 FT | 10,001 – 20,000 FT | 20,001 – 30,000 FT | 30,001 FT AND ABOVE |
|---|---|---|---|
|  |  |  |  |

INTERACTIVE METHOD FOR TESTING WORKING MEMORY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to the field of testing working memory. More specifically the present invention relates to the field of testing working memory of visual inputs for predicting performance of air traffic control candidates.

The use of color on information displays has increased dramatically during the past decade. Many information displays require an operator to retain and recall displayed information. Working memory includes items remembered for a long time, newly perceived information, and an understanding of the perceived environment.

Compared to other coding schemes, color is an effective coding dimension to reduce search time in search and identification tasks [Cahill, M. C. and R. C. Carter. 1976. "Color Code Size for Searching Displays of Different Density," Human Factors, vol. 18, pp. 542-570; Christ, R. E. 1975. "Review and Analysis of Color Coding Research for Visual Displays." Human Factors, vol. 17, no. 6, pp. 542-570; Man Factors, Inc. 1980. *Color Coding In Combat Direction System Displays*. San Diego, Calif.]. Color coding is helpful when a display is unformatted, symbol density is high, the operator's task is complex, and color is logically related to the operator's task [Meister, D. 1984. *Human Engineering Data Base For Design And Selection of Cathode-Ray Tube And Other Display Systems*. Navel Personnel and Research Development Center. San Diego, Calif.]. Color is also useful for grouping related information, relocating already identified information, and assisting the operator in keeping track of critical information [Neil, D. C. 1980. *Application of Color Coding In Tactical Display S-3A*. (DTIC AD-A086-517) Navel Postgraduate School, Monterey, Calif.]. Color does not aid the operator when a task is easy or the display is uncluttered [Krebs, M. J., J. D. Wolf, and J. H. Sandvig. 1978. *Color Display Design Guide*. ONR Rept. N00014-77-C-0349, Honeywell, Inc. Arlington, Va.].

Rehmann's report on the use of color displays and air traffic control specifically mentions two studies that were performed by the Euro Control Experimental Center (EEC) [Rehmann, J. T. 1984. *The Use of Color in Flight Service and Air Traffic Control*. Federal Aviation Administration]. The EEC found that color improved aircraft identification and label overlap conditions and helped controllers in judging which velocity vector applied to which track. In addition, color simplified and speeded up the information sorting process.

Two stimulus dimensions are used as coding variables in many displays. Saenz and Richie studied the effect of color and location tasks and found that performance with color as a primary code did not significantly differ from performance with color as a redundant code (color and shape) [Saenz, N. E. and C. V. Riche. 1974. "Shape and Color as Dimensions of a Visual Redundant Code," Human Factors, vol. 16, no. 3, pp. 308-313]. Other studies indicate that redundant coding facilitates the location of targets as opposed to coding on a single dimension [Krebs, Wolf and Sandvig, supra]. Ludder and Barber found that color as a redundant code decreased time and improved flying performance on airborne CRT displays [Luder, C. B. and P. J. Barber. 1984 "Redundant Color Coding on Airborne CRT Displays," Human Factors, vol. 26, no. 1, pp. 19-32]. Another study recommended the use of redundant color coding to retain essential information in cases where color failure or color shifts are a function of display aging [Silverstein, L. D. and R. M. Merrifield. 1981. "Color Selection and Verification Testing for Airborne Color CRT Displays," *Aircrew Display Symposium Proceedings*]. Shape as the primary encoding scheme would endure if colors faded on CRT displays.

A monochromatic Naval tactical data system (NTDS) display was used in a figurative (green/red) display to study the effect of color on memory [Bruck, L. A. and P. W. Hill. 1982. *Tactical Situation Displays and Figurative Symbology*, Naval Postgraduate School, Monterey, Calif.]. The figurative symbology consisted of more life like images than the standard tactical symbology. Subjects viewed the display for 50 seconds. A map of the display then was provided for each subject. Subjects were required to recall the allegiance and type of symbols that were displayed at the marked locations on the map. There were no significant differences in accuracy between the two display conditions. In the color figurative display, the shape denoted the symbol type and color denoted allegiance.

Color was used as a coding dimension to decrease the necessity for mental recall in an antisubmarine warfare (ASW) tactical display using static formats [Oda, D. J. and B. W. Barker. 1979. "The Application of Color to ASW TActical Displays," *Proceedings of the Society for Information Display*, vol, 20/1]. The standard non-color coded ASW display formats with standard numerics and graphics in the normal green color were compared with ASW formats of the same type but with color coding added to signify the age of the display data. Each static display represented a point in time for an ASW airborne localization mission. The subjects determined the most likely fixed positions for the target using the bearing lines that were two minutes old or less. Subjects verbally stated the selected fixed positions, and a test monitor circled these positions on an ASW tactical display score sheet and recorded subjects' time to analyze the format. Operator accuracy in interpreting data from the displays and time to analyze the fixed positions were statistically improved with the use of color.

Air traffic controllers almost always work from memory of inputs from various sources and from operations performed on the displayed data. On rare occasions air traffic control displays are not operative for periods ranging from seconds to minutes. On these occasions a flight data strip hard copy that lifts current data for departing, arriving and enroute aircraft can be referenced. Because air traffic controllers do not have time to obtain all the information from a flight data strip on each aircraft, the air traffic controllers must rely upon their memory when their displays are not functioning. By necessity air traffic controllers must have a certain minimum performance level for short term and working memory in an air traffic control (ATC) task specific situation. However, at the present time there is no task specific selection criteria for screening ATC candidates which would be useful in reducing ATC candidate attrition rates. Furthermore, there is no present method for quantitatively measuring air traffic controller job performance against either a comparative or standard performance criteria. Therefore, a need exists for a quantitative method for measuring the performance of ATC candidates and air traffic controllers in an ATC task specific environment. The use of color encoded displays may be used to solve this problem.

SUMMARY OF THE INVENTION

The present invention provides an interactive method for testing the working memory of a test subject which can be used as a quantitative predictor of job performance. The method includes displaying several encoded symbols positioned on a video display for a predetermined period of time. The position of each encoded symbol corresponds to Cartesian coordinates of the video display screen. Each symbol has a predetermined priority that must be ascertained by the test subject based on recognized variables associated with each encoded symbol. The symbols are deleted from the video display after expiration of the predetermined period. Then, unencoded symbols are displayed on the video display in the same pattern as were the encoded symbols so that there is a cardinal relationship between the Cartesian coordinates of the unencoded symbols and those of the encoded symbols. Each encoded and unencoded symbol having identical coordinates forms a symbol pair. The test subject's task is to assign a priority to the unencoded symbols based on the test subject's recollection of the priority of each encoded symbol. Software implementing the present invention compares the assigned priorities of the unencoded symbols to the actual priority of the encoded symbols and provides an output which is the sum of the number of correct priority assignments.

OBJECTS OF THE INVENTION

An object of the present invention is to provide a quantitative method for testing working memory.

A second object of the present invention is to provide a quantitative method for measuring working memory of visual inputs.

A third object of the present invention is to provide a quantitative method for measuring working memory of air traffic control candidates in an air traffic control task specific environment.

These and other objects of the invention will become apparent from the following detailed description of the invention when considered in conjunction with the accompanied drawings.

DESCRIPTION OF THE PREFERRED EMBODIMENT

The present invention provides an interactive method for testing the working memory of a test subject. The present invention is particularly useful for testing working memory of persons whose jobs require demanding levels of working memory performance, as for example air traffic controllers. The invention provides a quantitative assessment of working memory for purposes of determining levels of job performance or for screening candidates for likelihood of successful job performance. The method includes displaying several encoded symbols randomly positioned on a video display for a predetermined period of time. The position of each encoded symbol corresponds to Cartesian coordinates on the video display screen. Each symbol has a predetermined priority that must be ascertained by the test subject. The priority is based o variables that are more fully described herein. The symbols are deleted from the video display after expiration of the predetermined period. Then, unencoded symbols are displayed on the video display in the same pattern as were the encoded symbols so that there is a cardinal relationship between the Cartesian coordinates of the unencoded symbols and those of the encoded symbols. Each encoded and unencoded symbol having identical coordinates forms a symbol pair. The test subject's task is to assign a priority to the unencoded symbols based on the test subject's recollection of the priority of each encoded symbol.

The software that implements the present invention compares the assigned priority of each unencoded symbol to the actual predetermined priority of each encoded symbol and provides an output which is the sum of the number of correct priority assignments. This output is a quantitative measure of the working memory of the test subject.

Figure 1:
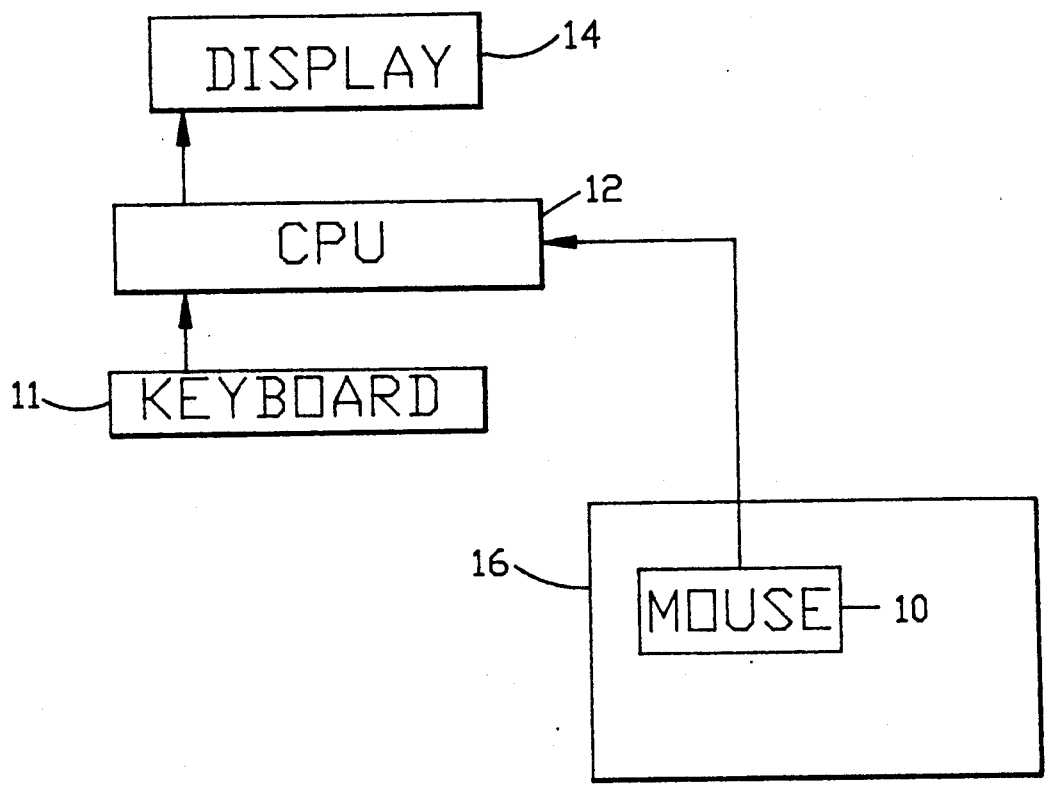
FIG. 1 is a block diagram of the equipment that implements the present invention.

Referring to the drawings wherein like reference numerals designate like or similar parts throughout the several views, there is illustrated in FIG. 1, equipment used to implement the method of the present invention which includes mouse 10 and keyboard 11 operably coupled to central processor 12 which provide inputs to central processor 12. Mouse 10 is preferably manipulated on mouse pad 16. By way of example, central processor 12 may be a Masscomp multiuser, Model 5600 UNIX-based minicomputer system having real time data acquisition capability; video display 14 is a color monitor which may have a 19 inch screen and a resolution of 1152×910 pixels. Central processor 12 is operated by computer software as described in APPENDIX 1, herein. It is to be understood that the scope of the invention comprehends the use of other central processors and video displays besides that equipment specifically identified herein.

The preferred embodiment of the present invention is described with reference to a method for testing working memory of air traffic control candidates. Therefore, the symbols presented on the video display are encoded with information relating to aircraft in flight that would be of particular interest to an air traffic control operator, as for example air speed, altitude, and position. However, it is to be understood that the scope of the invention comprehends the testing of working memory of test subjects engaged in other fields of endeavor where a certain level of working memory is an important job performance criteria. Such fields would include any type of job where a person is required to keep track of information that changes over time and which may be advantageously displayed on a video display, as for example, monitoring a combat information control center display or a power plant operations display.

Figure 2:
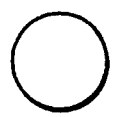
FIG. 2 is a table presenting symbols encoded with information corresponding to the altitude of an aircraft.
Figure 2:
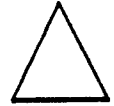
Figure 2:
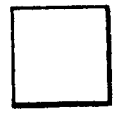
Figure 2:
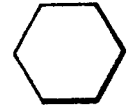

Symbols used in the preferred embodiment are of different geometric shapes that correspond to specific flight characteristics which are presented on the video display. By way of example, each symbol is approximately 0.22 inches across; line thicknesses are 0.012 inches. Referring to FIG. 2, a circle represents an aircraft flying below an altitude of 10,000 feet; a triangle represents an aircraft flying at altitudes of 10,001 to 20,000 feet; a squares denotes an aircraft flying at altitudes of 20,001 to 30,000 feet; and a hexagon represents aircraft flying direct relationship between the numbers of corners on each geometric shape and increased altitude. Furthermore, the symbols in FIG. 2 may also be color coded as described in TABLE 1.

TABLE 1

| Shape | Color |
| --- | --- |
| circle | red |
| triangle | orange |
| square | yellow |
| hexagon | white |

Lighter colors represent aircraft flying at higher altitudes.

Figure 3:
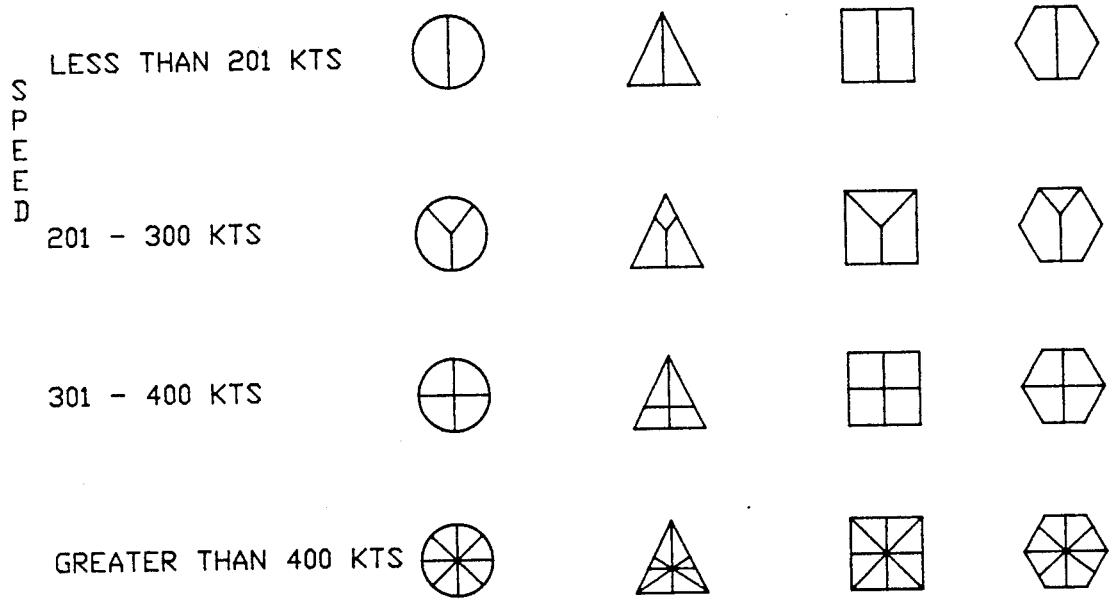
FIG. 3 is a table presenting symbols encoded with information corresponding to the altitude and speed of an aircraft.

Referring to FIG. 3, a second level of encoding was provided where both speed and altitude were presented on the display. The same shapes and colors as described with reference to FIG. 2 above were used. However, information provided by the symbols was supplemented with additional characteristics corresponding to speed as represented by one to eight lines positioned within each geometric shaped symbol. By way of example, one line represents an aircraft with an airspeed less than 201 knots; three converging lines correspond to an airspeed from 201 to 300 knots; four converging lines correspond to an airspeed ranging from 301 to 400 knots; and eight converging lines correspond to an airspeed greater than 400 knots.

Figure 4:
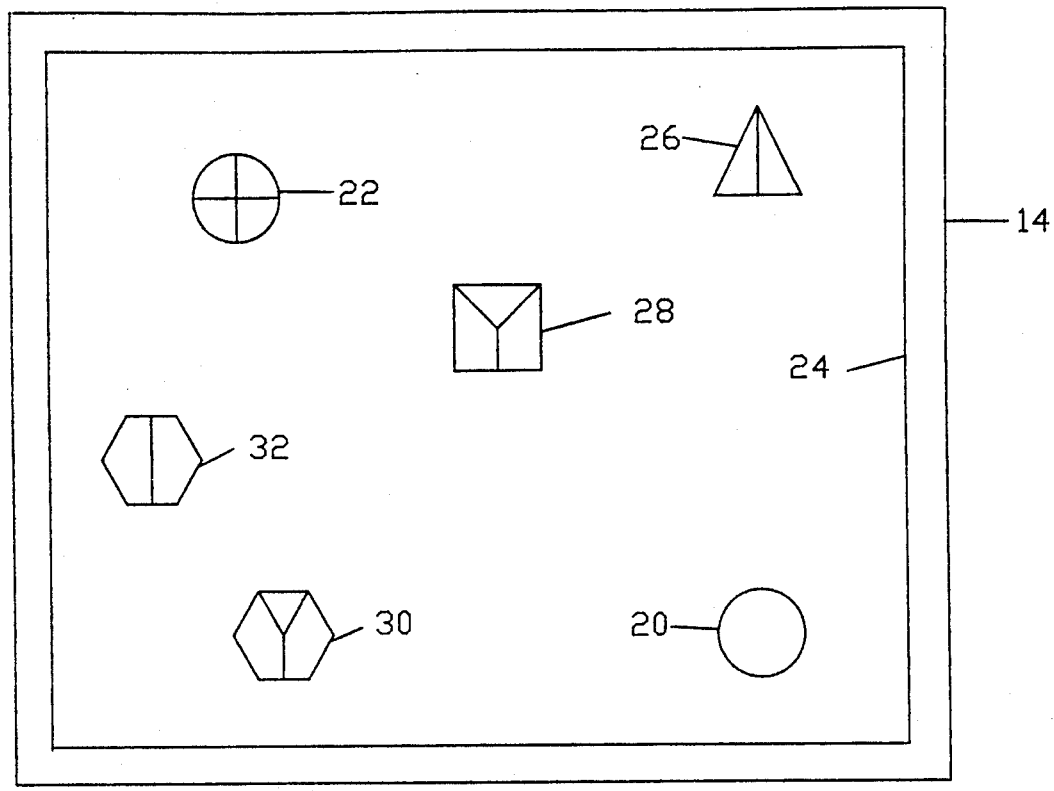
FIG. 4 illustrates a typical video display presentation of multiple symbols each encoded with information corresponding to the altitude and position of an aircraft.
Figure 5:
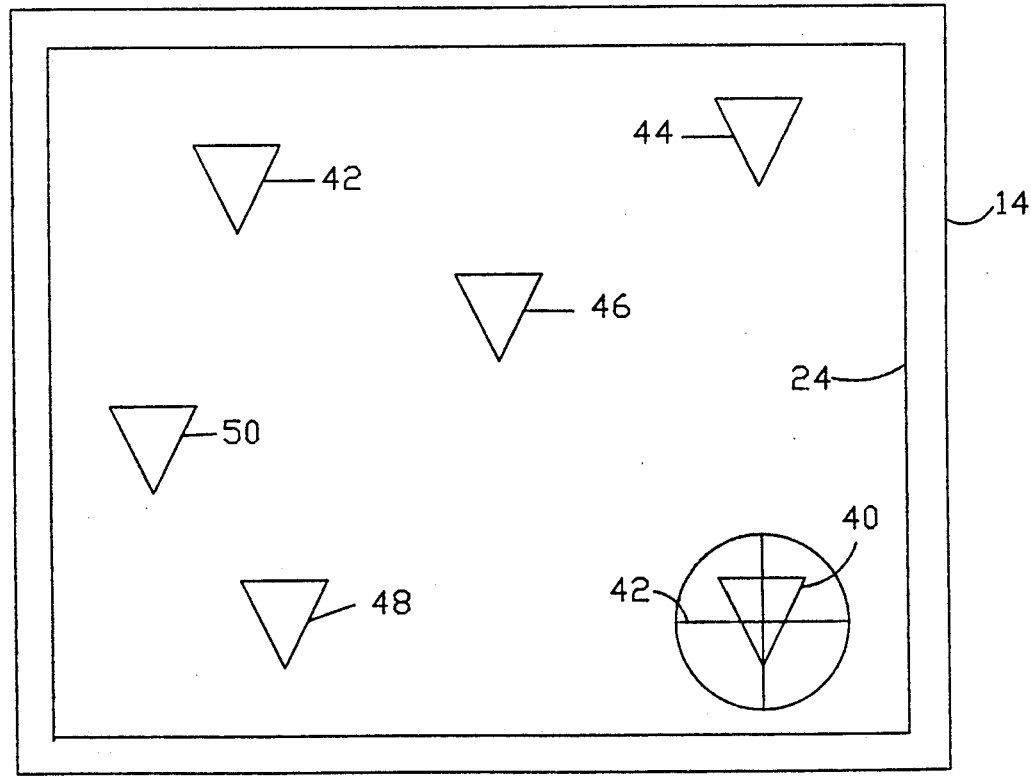
FIG. 5 illustrates a video display presentation of unencoded symbols which are to be assigned priorities by a test subject.

One implementation of the present invention involves presenting one or more displays of five to fourteen symbols of the type depicted in FIG. 2 in a pattern on the video display for a period of 20 seconds. As an example, FIG. 4 is a typical display depicting encoded symbols representing aircraft having different altitudes and positions. The test subject is to mentally assign a priority number to each symbol in accordance with criteria described below and then memorize the priority number the subject assigned to each symbol. After 20 seconds the encoded symbols disappear from the video display and are replaced with a set of uncoded symbols which may, by way of example, be solid diamonds, inverted triangles, or other geometric shapes that are positioned in the identical pattern on the video display as were the encoded symbols. FIG. 5 illustrates unencoded symbols that replaced the symbols illustrated in FIG. 4.

Priorities are assigned to the symbols according to the following criteria: A symbol corresponding to an aircraft flying at the lowest altitude has the highest priority. In other words, aircraft at the lowest altitude are sequenced for approach to the landing area before aircraft at higher altitudes were selected. Landing area 24 is represented by the right side of the video display, as shown in FIG. 4. If two or more symbols on the video represent aircraft flying at the same altitude, the symbols are to be prioritized so that the symbol corresponding to the aircraft closest to landing area 24 receives a higher priority than other symbols corresponding to aircraft flying at the same altitude, but further from landing area 24. Still referring to FIG. 4, circles 20 and 22 represent aircraft having altitudes less than 10,000 FT. However, circle 20 is closer to landing area 24. Therefore, circle 20 has a higher priority than circle 22. Triangle 26 corresponds to an aircraft having an altitude from 10,001 to 20,000 FT. Therefore, triangle 26 should be assigned the next priority. Square 28 corresponds to an aircraft having an altitude ranging from 20,001 to 30,000 FT and should be assigned the next priority. Hexagons 30 and 32 represent aircraft flying at altitudes above 30,000 FT. Since hexagon 30 is closer to landing area 24 than is hexagon 32, hexagon 30 has a higher priority than does hexagon 32. The test subject is tasked to mentally note the successive priorities of the symbols depicted in FIG. 4 and mentally assign a priority of "1" to circle 20, "2" to circle 22, "3" to triangle 26, "4" to square 28, "5" to hexagon 30, and "6" to hexagon 32.

Referring to FIG. 5, after the encoded symbols shown in FIG. 4 disappear, unencoded symbols appear on the video display in the same pattern as the encoded symbols. The test subject is required to assign the identical priority to each unencoded symbol as is associated with the encoded symbol that previously occupied the same position on the video display. Assigning priority numbers is accomplished by moving mouse 10 on mouse pad 16 until cross hairs 42, displayed on the video display, intersect the encoded symbol to be prioritized and then pressing a button on mouse 10. When the button on mouse 10 is pressed, the software which implements the present invention determines the priority of the particular symbol being prioritized by counting how many symbols have been prioritized. A number indicating the priority number is presented on the video display adjacent to the symbol. The symbols presented in FIG. 5 should be prioritized as shown in TABLE 2.

TABLE 2

| Priority | Symbol |
| --- | --- |
| 1 | 40 |
| 2 | 42 |
| 3 | 44 |
| 4 | 46 |
| 5 | 48 |
| 6 | 50 |

Figure 6:
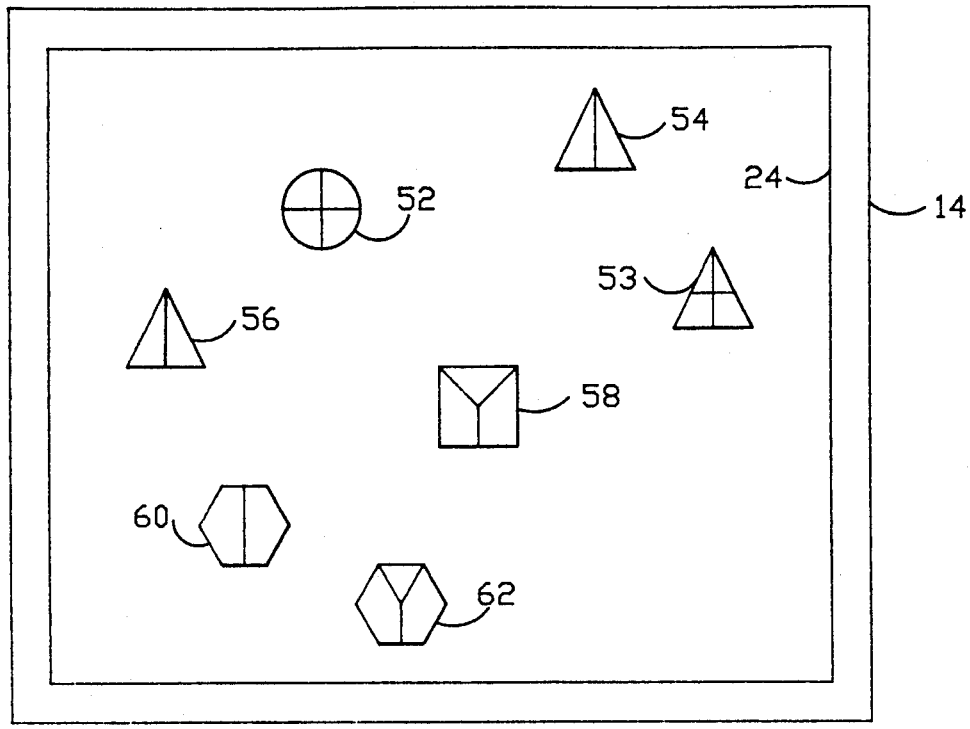
FIG. 6 illustrates a video display presentation of multiple symbols each encoded with information corresponding to the altitude, speed, and position of an aircraft.
Figure 7:
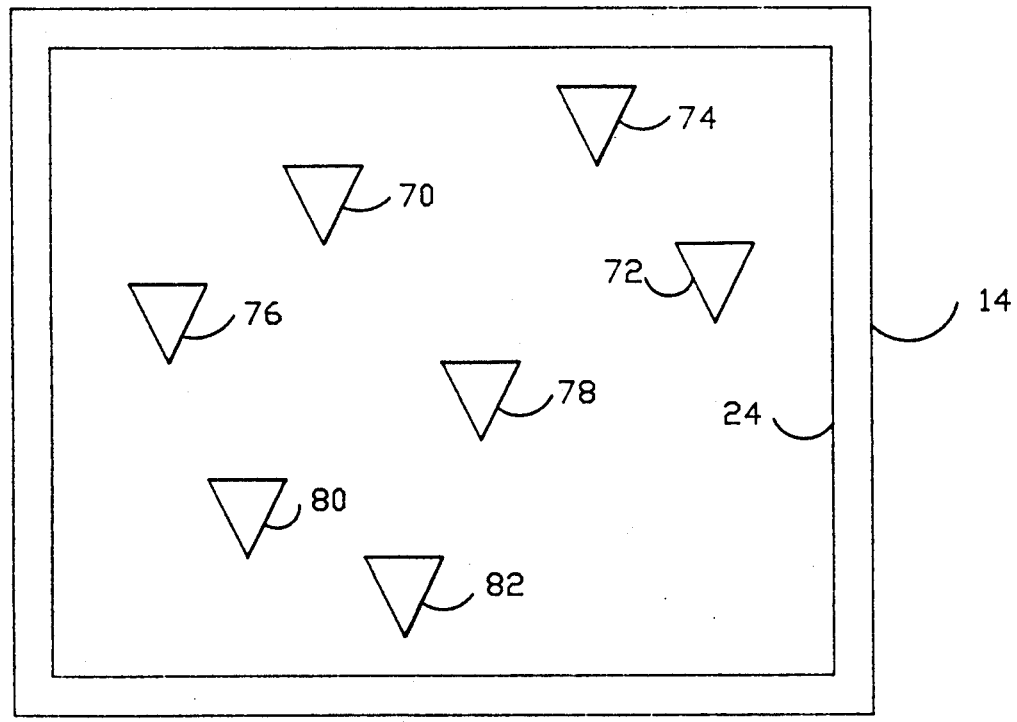
FIG. 7 illustrates a video display presentation of unencoded symbols which are to be assigned priorities by a test subject.

Another implementation of the present invention involves presenting one or more displays which may, for example, contain five to fourteen symbols of the type depicted in FIG. 3 in a random pattern on the video display for a period which may be 20 seconds. As an example, FIG. 6 is a typical display depicting encoded symbols representing aircraft having different altitudes, speeds, and positions. The test subject's task is to mentally assign a priority number to each symbol in accordance with criteria described below and then memorize the priority number assigned to each symbol. After a period which may be 20 seconds, the encoded symbols disappear from the video display and are replaced with a set of uncoded symbols, as shown in FIG. 7. The unencoded symbols may be a set of geometric shapes such as solid diamonds, inverted triangles, or any other suitable shape, such that the shapes are positioned in the identical pattern on the video display as were the encoded symbols previously shown in FIG. 6.

Priorities are assigned to the symbols according to the following criteria: The symbol corresponding to the aircraft flying at the lowest altitude has the highest priority. The symbol corresponding to aircraft at the lowest altitude are sequenced (receive a higher priority) for approach to landing area 24 before aircraft at higher altitudes were selected. Once again, landing area 24 is represented by the right side of the video display. If two or more symbols correspond to aircraft flying at the same altitude, the test subject is to prioritize the symbols in order of speed so that symbols corresponding to aircraft traveling at the fastest speed at any given altitude receive a higher priority than symbols corresponding to slower 4 aircraft traveling at the same altitude. The symbol corresponding to aircraft flying at the next lowest altitude having the lowest speed receives the next higher priority, and so forth. If two or more symbols correspond to aircraft at the same altitude and speed, the symbols are prioritized so that the symbol nearest landing area 24 receives the next higher priority; and the other symbol receives the next priority. This process is repeated until all of the symbols are assigned a priority number.

An understanding of the scheme described in the preceding paragraph is facilitated with reference to FIG. 6, where there are shown on video display 14 the following symbols: circle 52, triangles 53, 54 and 56, square 58, and hexagons 60 and 62. The test subject reviews the video display and mentally assigns priorities to all symbols based on their altitudes, speeds, and proximity to landing area 24. The priorities mentally assigned to the symbols, if correct, should correspond to those set forth as described in the paragraph immediately below.

Because circle 52 represents an aircraft flying at the lowest altitude (less than 10,000 FT), it has the highest priority, "1". Triangles 53, 54 and 56 represent aircraft flying at altitudes ranging from 10,001-20,000 FT, where triangle 53 has a speed ranging from 301-400 kts, and triangles 54 and 56 have speeds less than 200 kts. Therefore, triangle 53 has the next highest priority, "2". Triangles 54 and 56 represent aircraft flying in identical altitude and speed ranges, however, triangle 54 is closer to landing area 24, and therefore, has priority "3". Triangle 56 represents an aircraft having an altitude ranging from 10,001-20,000 FT traveling at a speed less than 200 kts and has priority "4". Square 58 represents an aircraft flying at an altitude ranging from 20,001-30,000 FT and having a speed ranging from 201-300 kts; it receives a priority "5". Hexagons 60 and 62 corresponds to aircraft flying at altitudes in excess of 30,000 FT. Hexagon 60 indicates a speed less than 201 kts hexagon 62 indicates a speed ranging from 201-300 kts. Therefore, hexagon 62 has priority "6" and hexagon 60 has priority of "7". These symbols are displayed 20 seconds and then disappear from the video display.

Referring to FIG. 7, after the encoded symbols shown in FIG. 6 disappear, unencoded symbols 70, 72, 74, 76, 78, 80, and 82 appear on the video display in the same pattern as the encoded symbols. The test subject is required to assign a priority to each unencoded symbol as is correctly associated with the encoded symbol that previously occupied the same position on the video display, as depicted in FIG. 6. Assigning priority numbers is accomplished by moving mouse 10 on mouse pad 16 as previously described above. The priority for each symbol is presented adjacent to the prioritized symbol immediately after being selected. If correctly done, the unencoded symbols are prioritized as shown in TABLE 3, below.

TABLE 3

| Priority | Symbol No. |
| --- | --- |
| 1 | 70 |
| 2 | 72 |
| 3 | 74 |
| 4 | 76 |
| 5 | 78 |
| 6 | 82 |
| 7 | 80 |

The tests described above (altitude/position and altitude/speed/position) provided subjects options to correct mistakes by permitting them to reprioritize either the last three or all of the unencoded symbols that had been prioritized. For example, if a test candidate had already sequenced six aircraft on a display showing 14 symbols and found an error in the sequence, the test candidate could eliminate assigned priorities "6", "5", and "4" by moving the cursor to the symbols having priorities "6", "5", and "4", in that order, and pressing a button on the mouse. THe test subject could then assign priorities to all of the 11 remaining unprioritized symbols.

After all of the symbols are sequenced, a question is presented at the bottom of the video display asking if the test subject desires reprioritizing all of the symbols. If the test subject responds "YES", the symbols may be prioritized in their entirety, as previously.

Subjects received feedback on their total scores when testing was finished. The total number of symbols that were correctly sequenced in all scenarios is displayed along with the total number of planes that were sequenced and total number of displays presented to the test subjects.

Software to implement the method of the present invention may be written in the "C" language in accordance with the steps provided in APPENDIX 1, attached herewith. However, it is to be understood that the scope of the invention comprehends the use of software other than that specifically described in APPENDIX 1, which may not utilize the "C" language.

Obviously, many modifications and variations of the present invention are possible in light of the above teachings. It is therefore to be understood that within the scope of the appended claims the invention may be practiced otherwise than as specifically described.

We claim:

1. A method for testing working memory of a test subject, comprising the steps of:
    displaying a first set of pictograms in a stationary pattern on a video display for observation by said test subject, each said pictogram having Cartesian coordinates with respect to said video display and a predetermined priority corresponding to a distance between said pictogram and a reference position on said video display;

deleting said first set of pictograms from said video display after expiration of a predetermined period of time;

displaying a second set of pictograms in said stationary pattern on said video display after the step of deleting, said pictograms of said second set of pictograms being identically shaped and colored with respect to one another;

providing a priority assignment for each of said pictograms of said second set of pictograms from said test subject after displaying said second set of pictograms; and providing an output functionally related to comparisons between said priorities of said pictograms of said first set of pictograms and said priorities of said pictograms of said second set of pictograms.

2. The method of claim 1, wherein said pictograms of said first set of pictograms each have a color, said priority of each said pictogram of said first set of pictograms being functionally related to said color and to said distance between said pictogram of said first set of pictograms and said reference position; and said pictograms of said second set of pictograms each have a shape and color identical with respect to one another.

3. The method of claim 1, wherein said pictograms of said first set of pictograms each have a shape, said priority of each said pictogram of said first set of pictograms being functionally related to said distance between said pictogram and said reference position, said color, and to said shape of said pictograms of said first set of pictograms, and said pictograms of said second set of pictograms each have a shape and color identical with respect to one another.

4. A method for testing working memory of a test subject, comprising the steps of:

(1) displaying a first set of pictograms in a stationary pattern on a video display for observation by the test subject, each of said pictograms having Cartesian coordinates on said video display and a predetermined priority corresponding to a distance between said pictogram and a reference position on said video display;

(2) deleting said first set of pictograms from said video display after expiration of a predetermined period of time;

(3) displaying a second set of pictograms in said stationary pattern on said video display, wherein said pictograms of said second set of pictograms are identically shaped and colored with respect to one another, and each said pictogram of said second set of pictograms has Cartesian coordinates on said video display;

(4) providing a priority for each of said pictograms of said second set of pictograms into a data processor by said test subject;

(5) comparing by said data processor the predetermined priority of each one of said pictograms of said first set of pictograms with said priority of one of said pictograms of said second set of pictograms, where said Cartesian coordinates of both said one of said pictograms of said first and second set of pictograms are identical; and (6) providing an output by said data processor, where said output is functionally related to the results of step (5).

5. The method of claim 4, wherein said step (1) further includes displaying each of said pictograms of said first set of pictograms with a color, wherein for each said pictogram of said first set of pictograms, said predetermined priority is functionally related to said color of said pictogram and to said distance between each said pictogram and said reference position on said video display.

6. The method of claim 5, further includes displaying said pictograms of said first set of pictograms with a shape where for each said pictogram of said first set of pictograms, said predetermined priority of said pictogram in functionally related to said color and shape of said pictogram and to said distance between said pictogram and said reference position on said video display.

* * * * *